United States Patent [19]

White

[11] Patent Number: 5,156,811

[45] Date of Patent: Oct. 20, 1992

[54] PIPETTE DEVICE

[75] Inventor: David A. White, Carlsbad, Calif.

[73] Assignee: Continental Laboratory Products, Inc., San Diego, Calif.

[21] Appl. No.: 734,533

[22] Filed: Jul. 23, 1991

Related U.S. Application Data

[63] Continuation-in-part of Ser. No. 609,996, Nov. 7, 1990, abandoned.

[51] Int. Cl.[5] .................. B01D 39/16; B01L 3/02; G01N 1/12
[52] U.S. Cl. .................. 422/100; 422/101; 422/68.1; 436/177; 436/178; 436/180; 210/416.1; 210/477; 210/500.36; 210/500.42; 73/863.23; 73/864.11; 73/864.13; 73/864.16
[58] Field of Search .................. 422/100, 101, 68.1; 436/177, 178, 180; 210/406, 416.1, 477, 500.36, 500.42; 73/863.23, 864.01, 864.11, 864.13, 864.16

[56] References Cited

U.S. PATENT DOCUMENTS

| | | | |
|---|---|---|---|
| 3,215,500 | 11/1965 | Bittner | 23/259 |
| 3,693,804 | 9/1972 | Grover. | |
| 3,864,979 | 2/1975 | Ayres | 422/100 X |
| 3,891,392 | 6/1975 | Betts et al. | 436/180 X |
| 3,985,032 | 10/1976 | Avakian | 422/101 X |
| 4,059,020 | 11/1977 | Avakian | 73/425.4 |
| 4,189,385 | 2/1980 | Greenspan | 210/136 |
| 4,267,729 | 5/1981 | Eddelman et al. | 73/425.4 |
| 4,483,825 | 11/1984 | Fatches | 422/101 X |
| 4,588,555 | 5/1986 | Provonchee | 422/100 X |
| 4,810,394 | 3/1989 | Masuda | 436/177 X |
| 4,999,164 | 3/1991 | Puchinger et al. | 422/100 |
| 5,019,349 | 5/1991 | Suzuki | 422/73 |

FOREIGN PATENT DOCUMENTS

2220135  9/1974  France .................. 422/100

Primary Examiner—Lynn M. Kummert
Attorney, Agent, or Firm—Brown, Martin, Haller & McClain

[57] ABSTRACT

A hollow pipette member open at its opposite ends contains a plug of porous, hydrophobic material force fitted between its ends to define a liquid sample chamber between the plug and one end of the tube. At least a major portion of the pores of the plug material are impregnated with particles of a liquid scavenging material which are of smaller size than the pores so as to allow gas to be drawn through the plug. The liquid sample chamber is of predetermined volume greater than the volume of liquid drawn by a suitable suction device attached to the opposite end of the tube, so that an air gap will remain between the drawn sample and the plug. Any liquid droplets vaporized and drawn into the plug member will contact the hydrophilic particles, which will expand to block passage through those pores while still permitting gas flow through other pores. If the liquid sample itself contacts the plug, enough particles will expand to completely block gas or liquid flow through the plug.

12 Claims, 2 Drawing Sheets

ID DEVICE

CROSS-REFERENCES TO RELATED APPLICATIONS

This application is a Continuation-In-Part of Application Ser. No. 07/609,996 of the same Applicant, filed Nov. 7, 1990 and entitled "Barrier Tip for Air Displacement Pipettor", now abandoned.

BACKGROUND OF THE INVENTION

The present invention relates generally to pipette devices for drawing and subsequently ejecting a predetermined volume of liquid.

Pipettes are commonly used in chemical, biological and medical research laboratories to draw and dispense accurate quantities of liquid samples. Such pipettes normally comprise hollow glass tubes secured to a suction device or pipettor at one end for drawing a predetermined volume of liquid through the opposite end of the tube and subsequently ejecting the drawn liquid into another vessel for analysis or other treatment. The pipettor or suction device generally comprises a simple pumping device such as a piston or plunger and cylinder arrangement, a simple elastic bulb, a bellows, or other suction device. The pipette is normally cleaned and sterilized or discarded after each use. In medical applications the pipette will normally be discarded to prevent any possibility of contamination or infection.

One major problem with such liquid sampling arrangements is that the pipettor or suction device itself may become contaminated by a liquid sample, resulting in potential hazards to operators as well as cross-over contamination in subsequently drawn samples. One major cause of such contamination is the so-called aerosol effect, in which some of the liquid sample is vaporized and forms droplets which are drawn upwardly with the air as it is drawn out of the pipette by the suction device. Such contamination can also occur if the operator holds the pipette wrongly while drawing or transporting the sample, for example at an angle rather than vertically, if the pipette is jarred or moved too quickly, so that the liquid flows to the pipettor end of the tube, or if the liquid foams or bubbles up the tube.

Previous attempts have been made to alleviate such problems by inserting a physical barrier into the pipette. However, the barrier must necessarily allow gas flow in order to draw and subsequently dispense the liquid sample, and thus does not completely eliminate any risk of contamination. Such barriers are normally of cotton or similar material, which will not completely block passage of aerosol droplets. Additionally, if liquid actually contacts such a barrier, it will be drawn along the barrier by a wicking effect to the upper side, where there is nothing preventing it from contacting the suction device. Thus, there is no guarantee that existing barriers will completely block aerosol droplets, and even small amounts of such droplets give rise to contamination and potential hazards to personnel where infectious materials are concerned. Also, even contact with the barrier itself may give rise to contamination of the drawn sample by the barrier material, and also gives rise to inaccuracies in the amount of liquid dispensed.

SUMMARY OF THE INVENTION

It is an object of the present invention to provide a new and improved pipette device for drawing and dispensing liquid samples.

According to the present invention, a pipette device is provided which comprises a hollow tube having open first and second ends, and a plug member of porous material fitted into the tube intermediate its ends to define a liquid sample chamber between the plug member and second end of the tube. The first end of the tube is adapted for attachment to a suction device for drawing a predetermined volume of liquid into the liquid sample chamber. The porous material of the plug member is impregnated with particles of a liquid scavenging or hydrophilic material, the particle dimensions being less than the average pore size so that they do not completely fill the pores but allow gas to flow through the pores. At least the majority of the pores contain particles of the hydrophilic material. The liquid sample chamber is of predetermined volume greater than the predetermined liquid volume, such that an air gap will remain between a drawn sample and the plug member, and the sample will not be contaminated by the material of the plug member itself.

Thus, any aerosol droplets drawn up with the air by the suction device will contact hydrophilic particles, which will absorb the liquid and expand to block the respective pores. However, other pores will still remain open to allow gas to flow back and forth to draw and subsequently expel the sample. The arrangement is such that, if the liquid sample itself by some chance comes into contact with the plug member, sufficient hydrophilic particles will expand to completely block the plug member and make the pipette inoperative. The contaminated sample can no longer be expelled from the pipette and must be discarded with the pipette.

Preferably, the air gap volume is in the range from 10-40%, preferably 10-15% of the total volume of the liquid sample chamber, to leave a sufficient gap under normal circumstances that contact of the plug member by the liquid is unlikely to occur if the pipette is tilted slightly, for example.

In the preferred embodiment of the invention the plug member is not physically attached to the inner wall of the tube by any adhesive material, but is force fitted into the tube under pressure so that it will not move and forms a frictional seal with the inner wall of the tube. Preferably, the tube itself is of gradually tapering or conical cross-section between its ends, and the plug member comprises a disc of similar frusto-conical shape for fitting in the tube at the appropriate height to define a liquid sample chamber of the desired dimensions.

With this arrangement, liquid samples can be drawn with essentially no risk of contamination of the suction device by aerosol droplets or the liquid sample flowing up the tube, while gas flow back and forth through the tube is blocked if the liquid sample actually contacts the plug member, presenting a contamination risk.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which.

DETAILED DESCRIPTION OF THE PREFERRED EMBODIMENT

Figure 1:
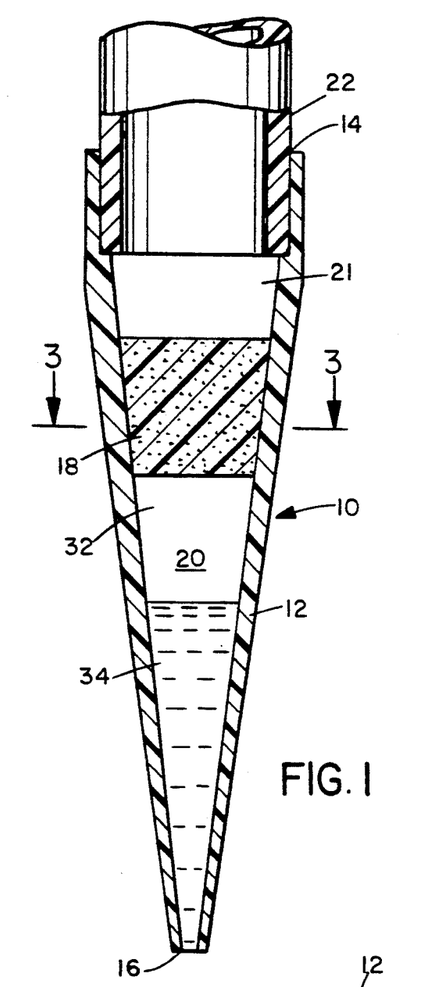
FIG. 1 is a vertical cross-sectional view of a pipette device according to a preferred embodiment of the present invention.
Figure 2:
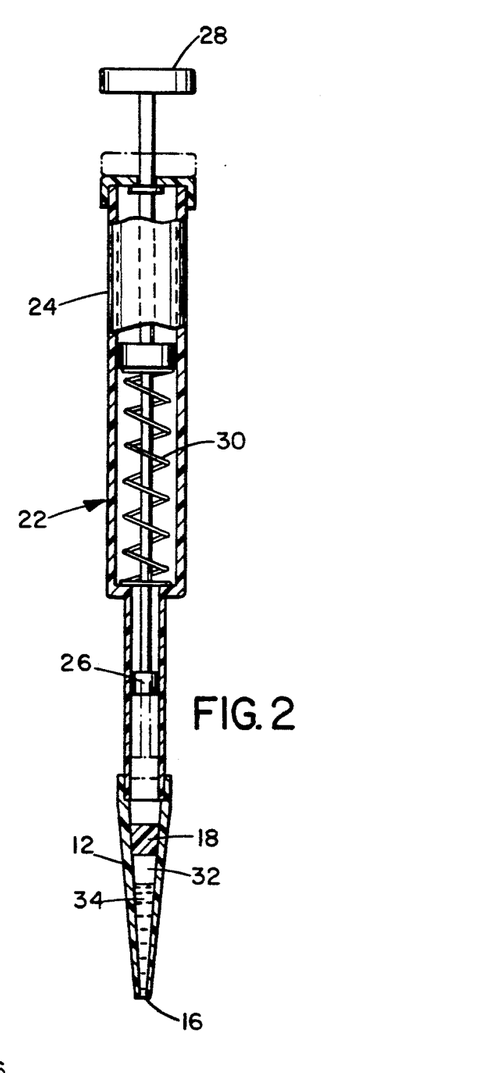
FIG. 2 is a sectional view similar to FIG. 1 but on a reduced scale illustrating the pipette device attached to an exemplary suction device for drawing liquid into the pipette.
Figure 3:
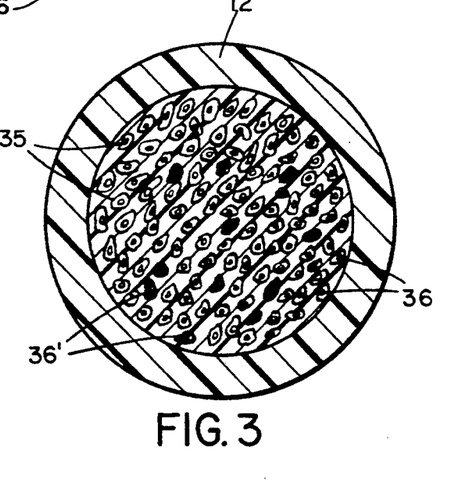
FIG. 3 is a partial section on an enlarged scale of the plug material, taken on the lines 3—3 of FIG. 1.

FIGS. 1 to 3 illustrate a pipette device 10 for drawing and dispensing liquid samples according to a preferred embodiment of the present invention. The pipette device 10 basically comprises a tapering, hollow tubular member 12 of non-reactive material such as glass, open at its opposite first and second ends 14, 16, and a plug member 18 of porous, hydrophobic material disposed in the tubular member 12 between its ends to define a liquid sample chamber 20 between the plug member 18 and second end 16 of the tube. The plug member is also spaced from the first end 14 of the tube to define an air barrier or chamber 21 between the plug member and end 14 of the tube.

The first end 14 of the tubular member 12 is releasably secured to a suitable suction device 22 in a manner known in the field, as generally illustrated in FIG. 2. Any suitable suction device for drawing a predetermined volume of liquid into the chamber 20 may be used, such as the volumetric pipettor illustrated in the drawings, or a suction pump, elastic bulb, bellows, or the like as are commonly used to draw liquids in the laboratory analysis field. The suction device 22 illustrated by way of example in FIG. 2 comprises cylinder or tube 24 and piston 26 slidable in tube 24 and attached to a plunger 28 extending out of one end of tube 24. The opposite end of the tube 24 is secured to the first end 14 of the member or pipette 12. Piston 26 is urged upwardly to draw a predetermined volume of liquid equivalent to the piston displacement via return spring 30.

The plug member is preferably force or pressure fitted securely into tube 12, under a pressure of the order of 1800 lb, so that it is securely held and frictionally sealed against the inner wall of tube 12 although not physically attached to the inner wall by any adhesive or other extraneous material. The plug member has a tapering, frusto-conical shape of dimensions matching that of the tube 12 at a predetermined location intermediate its ends, so that the plug member will be compressed as it is forced into the tube and released at the desired position to seal against the inner wall of the tube and define a liquid sample chamber 20 of predetermined dimensions. The liquid sample chamber is arranged to be of predetermined volume greater than the liquid sample volume which will be drawn by one full stroke of the suction device. The dimensions of the chamber 20 beneath plug member 18 are such that there will be a substantial air gap 32 between plug member 18 and a drawn liquid sample 34 to reduce the risk of liquid actually contacting the plug member. The air gap is preferably in the range from 10–40% of the total volume of chamber 20. Thus, one complete stroke of the suction device will draw only enough liquid to fill 60–90% of the volume of chamber 20, as indicated in FIG. 1. In one example, an air gap of the order of 10–15% was found to be effective, although larger air gaps may be desirable in some circumstances.

The plug member is formed of a suitable porous material such as polyethylene, which is non-wicking and hydrophobic, and is non-reactive with most sample chemicals and organics. The pores 35 running through the material will enable gas flow in both directions through the plug member to draw liquid into the pipette and to subsequently eject the liquid sample. At the same time, as best illustrated in FIG. 3, particles 36 of a liquid scavenging or hydrophilic material such as cellulose gum are impregnated through the pores of plug member 18. These particles are of a size less than the average pore size of the material when non-hydrated. On contact with a sample liquid, the particles will hydrate and expand to close off pores, as illustrated at 36' in FIG. 3.

Preferably, the pore size is of the order of 25 to 40 microns and the plug member has a length of around 4 mm. Plug member with cellulose gum particles 36 impregnated through its pore structure may be suitably manufactured by mixing cellulose gum in powder form with beads of high density polyethylene material. The mixture is then ground up. The ground mixture is then heated to form a slurry, and subsequently blown up to form a porous structure having the desired pore size before forming the material into plug members of the desired shape and dimensions. This results in an end product in which powdered cellulose gum particles are distributed through most of the pores, but the pores will still be large enough to allow gas to pass freely through the plug member.

Figure 5:
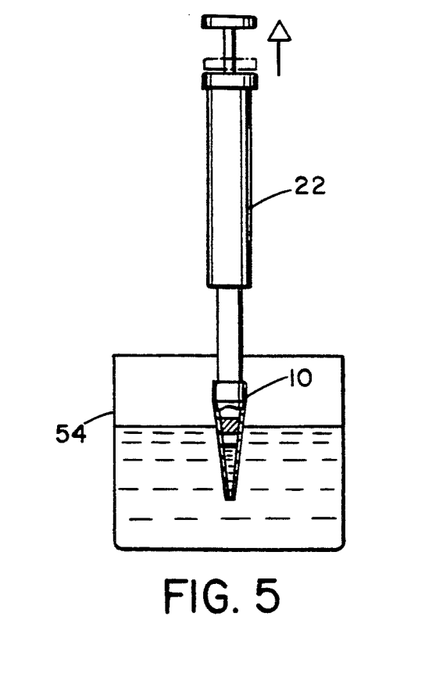
FIGS. 5 and 6 are side elevational views illustrating the method of using the device to transfer a liquid sample.
Figure 6:
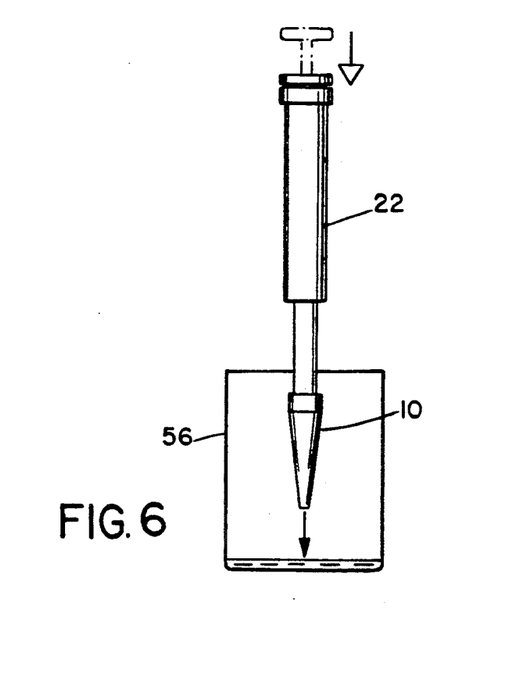

In order to draw a liquid sample into pipette tube 12, the suction device or plunger is first depressed or compressed, as appropriate, and the tip or end 16 of the tube is submerged below the surface of a liquid to be sampled in a container 54, as generally indicated in FIG. 5. The plunger is then raised to draw a predetermined volume of liquid into sample chamber 20 so that the surface of the drawn sample is spaced a substantial distance below the plug member 18. Any aerosol droplets drawn up into plug member 18 will come into contact with liquid scavenging particles 36, which will absorb the liquid and expand to block the respective pores, as indicated at 36' in FIG. 3. However, other pores in the plug member will still remain unblocked, allowing passage of gas through the plug member to draw in and subsequently eject or blow out the sample. As long as the tubular member 12 is held more or less erect and not tilted or bounced during the sampling process, no liquid will come into contact with plug member 18 because of the air gap 32 produced by the predetermined volume of sample chamber 20 being substantially greater than the volume of fluid drawn by one stroke of the suction device. When the sample has been drawn, the pipette and attached pipettor are transferred carefully to a location above a vessel or sample collector into which the liquid sample is to be ejected for subsequent research or analysis. The sample is held in the tube under suction during this transfer procedure. Once the pipette tip is positioned above collector 56, the suction device is actuated, for example by depressing the plunger in the device of FIG. 2, in order to blow gas or air back through the plug member and force the liquid sample out of the pipette, as indicated in FIG. 6.

If for some reason the liquid sample actually contacts the plug member during the sampling procedure, for example because the operator accidentally tilts the tube too far or it is jarred against something, causing the liquid to splash upwardly, or the sample foams or bubbles to force liquid up against the plug member, sufficient liquid will be absorbed by the hydrophilic particles to block sufficient pores in the plug member to form a complete seal against any further passage of gas through the plug member. Thus, the liquid sample, which will contain impurities due to contact with the plug member, cannot be ejected from the pipette since air cannot be blown back through the plug member. In this case, the pipette tip and enclosed, contaminated sample are discarded, and a new pipette tip is attached to the suction device to draw a new, uncontaminated sample from the source. Even if the liquid sample does contact the plug member, liquid will not be transmitted to the top of the plug member and there is essentially no risk of contamination of the suction device, due to the liquid absorbing particles impregnated in the plug member which will tend to absorb all liquid they come into contact with and subsequently block passage of any additional liquid through the pore structure. As an additional safeguard, the air barrier chamber 21 above the plug member also isolates the suction device from any actual contact with the plug member.

Figure 4:
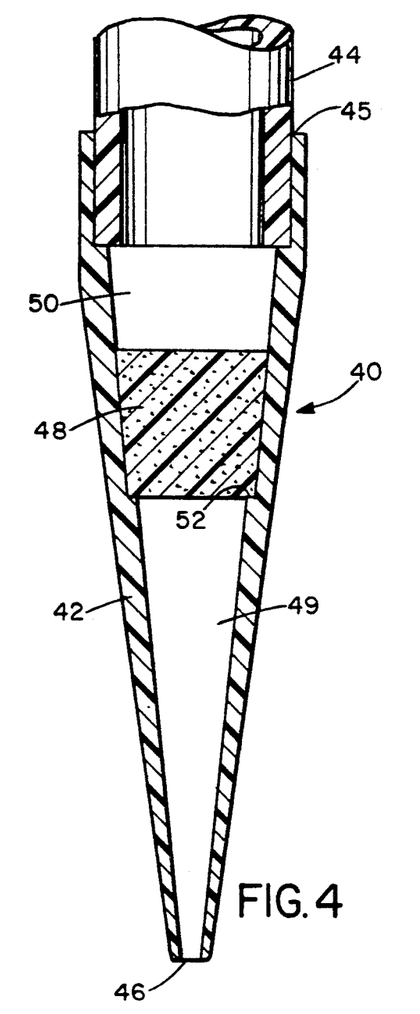
FIG. 4 is a cross-section similar to FIG. 1 illustrating a modification.

FIG. 4 illustrates a modified pipette or tip 40 which again comprises a hollow, frusto-conical or tapering tubular member 42 for securing to a suitable pipettor or suction device 44 at one end 45 so as to draw a liquid sample into the pipette through the opposite end 46. A plug member 48 which is of the same material as plug member 18 in the embodiment of FIGS. 1 to 3 is force or friction fitted into the member 42 at an intermediate point between its ends so as to define a liquid sample chamber 49 on one side and an air barrier chamber 50 on the opposite side of plug member 48. However, in FIG. 4 the inner wall of member 42 is provided with a step or shoulder 52 against which the plug member 42 is seated and which prevents movement of the plug member any further along the bore of tubular member 42. As in the previous embodiment, the sample chamber 49 has a volume substantially greater than that of a liquid sample drawn by one full stroke of the suction device, so that an air gap will be left between a drawn sample and the plug member. The modified pipette 40 operates in the same way as the pipette 10 of FIGS. 1 to 3 as described above.

The pipette device of this invention will greatly reduce the risk of contamination of the pipettor or suction device and resultant cross-over contamination to subsequent samples, and will also substantially reduce the risk to personnel when handling potentially infectious or other hazardous materials. The risk of passage of any liquid from the sample through the plug member to its upper surface is substantially eliminated. Any liquid droplets drawn into the plug member will enter pores and contact hydrophilic particles, which will expand to block those pores, while gas flow is still permitted through other pores. Additionally, since the drawn liquid sample does not contact the plug member, an accurate sample quantity is obtained every time. If the sample should accidentally contact the plug member, the plug member immediately seals off, preventing ejection of the sample from the pipette. Thus, use of inaccurate and possibly contaminated samples is positively prevented.

Although some preferred embodiments of the invention have been described above by way of example only, it will be understood by those skilled in the field that modifications may be made to the disclosed embodiments without departing from the scope of the invention, which is defined by the appended claims.

I claim:

1. A pipette device, comprising:
   a hollow tube open at opposite first and second ends thereof;
   a plug member of porous, hydrophobic material located in the tube between said first and second ends and spaced a predetermined distance from said second end to define a liquid sample chamber of predetermined volume below said plug member, at least a majority of pores of said porous material containing separate particles of a hydrophilic material for absorbing any liquid contacting said plug member, the particles being smaller than the pore size to allow gas to flow through said plug member, and comprising means for expanding and blocking said pores when contacted by a liquid; and
   the first end of the tube comprising means for attachment to a suction device for drawing a predetermined volume of liquid less than said liquid sample chamber volume in through the second end of the tube to leave an air gap between the plug member and liquid when a sample of liquid is drawn into the tube.

2. The device as claimed in claim 1, wherein said predetermined volume of said liquid sample a predetermined volume of liquid drawn in by the suction device.

3. The device as claimed in claim 1, wherein the plug member is press fit into said tube.

4. The device as claimed in claim 1, wherein said plug member defines an air barrier chamber of predetermined dimensions between the plug member and said first end of the tube.

5. The device as claimed in claim 1, wherein the tube is of gradually tapering cross-section from said first end to said second end.

6. The device as claimed in claim 5, wherein said plug member is of gradually tapering diameter and is dimensioned to be press fit at a predetermined location in said tube intermediate the ends of said tube.

7. The device as claimed in claim I, wherein the plug member is of porous polyethylene material.

8. Liquid sampling apparatus, comprising:
   a hollow tube open at opposite first and second ends thereof;
   a plug member of porous, hydrophobic material located in the tube between said first and second ends to define a liquid sample chamber of predetermined volume between the plug member and said second end of the tube, at least a majority of pores of said hydrophobic material containing separate particles of hydrophilic material for absorbing any liquid contacting said plug member; and
   suction means secured to the first end of said hollow the for drawing a predetermined volume of liquid less than the predetermined volume of said liquid sample chamber into said liquid sample chamber to leave an air gap of predetermined volume between a drawn liquid sample and the plug member.

9. The apparatus as claimed in claim 8, wherein the suction means comprises means for drawing in a liquid sample of predetermined volume sufficient to leave an air gap of a volume of at least 10%-15% of the liquid sample chamber volume.

10. A method of transferring a predetermined volume of liquid from one location to another for analysis, comprising the steps of:

attaching a suction device to a first end of an open-ended tube having a plug of porous, hydrophobic material positioned at a predetermined height in the tube to define a liquid sample chamber of predetermined volume between the plug and the opposite, second end of the tube, at least a majority of pores of the plug containing separate hydrophilic particles of smaller dimensions than the pores;

placing the opposite end of the tube into a supply of liquid to be sampled;

applying suction to the first end of the tube via the suction device to draw a predetermined volume of liquid into the tube until the surface of the drawn liquid lies a predetermined distance below the plug to form an air gap between the drawn liquid and plug;

absorbing any aerosol droplets carried into the plug in some of the hydrophilic particles in the pores to expand the particles and block some of the pores;

transferring the tube and drawn sample to a collection device for collecting the drawn sample; and reversing the suction device to blow air back through the plug and eject the sample into the collection device.

11. The method as claimed in claim 10, including the additional steps of expanding sufficient particles to completely block the plug against flow of liquid or gas through the plug if the liquid sample is drawn up sufficiently to contact the plug and discarding the tube and drawn sample if the liquid sample contacts the plug.

12. The method as claimed in claim 10, wherein the step of applying suction to the first end of the tube comprises drawing a predetermined volume of liquid into the tube to leave an air gap between the bottom of the plug and the liquid surface having a volume of at least 10%-15% of the total liquid sample chamber volume.

* * * * *

(12) EX PARTE REEXAMINATION CERTIFICATE (6857th)
United States Patent
White (10) Number: US 5,156,811 C1
(45) Certificate Issued: Jun. 9, 2009

(54) PIPETTE DEVICE

(75) Inventor: David A. White, Carlsbad, CA (US)

(73) Assignee: Molecular Bioproducts, Inc., San Diego, CA (US)

Reexamination Request:
No. 90/006,511, Jan. 10, 2003

Reexamination Certificate for:
Patent No.: 5,156,811
Issued: Oct. 20, 1992
Appl. No.: 07/734,533
Filed: Jul. 23, 1991

Related U.S. Application Data (63) Continuation-in-part of application No. 07/609,996, filed on Nov. 7, 1990, now abandoned.

(51) Int. Cl.
*B01D 39/16* (2006.01)
*B01L 3/02* (2006.01)

(52) U.S. Cl. .................. 422/100; 210/416.1; 210/477; 210/500.36; 210/500.42; 422/101; 422/68.1; 422/931; 436/177; 436/178; 436/180; 73/863.23; 73/864.11; 73/864.13; 73/864.16

(58) Field of Classification Search .................. None
See application file for complete search history.

(56) References Cited

U.S. PATENT DOCUMENTS

| | | | |
|---|---|---|---|
| 3,215,500 A | 11/1965 | Bittner | |
| 3,661,815 A | 5/1972 | Smith | |
| 3,693,804 A | 9/1972 | Grover | |
| 3,748,909 A | 7/1973 | Kuo | |
| 3,838,013 A | * 9/1974 | Bergeron | .................. 435/304.1 |
| 3,864,979 A | 2/1975 | Ayres | |
| 3,891,392 A | 6/1975 | Betts et al. | |
| 3,898,143 A | 8/1975 | Assarsson | |
| 3,982,538 A | 9/1976 | Sharpe | |
| 3,985,032 A | 10/1976 | Avakian | |
| 4,059,020 A | 11/1977 | Avakian | |
| 4,076,663 A | 2/1978 | Masuda et al. | |
| 4,160,059 A | 7/1979 | Samejima | |
| 4,189,385 A | 2/1980 | Greenspan | |
| 4,228,798 A | 10/1980 | Deaton | |
| 4,267,729 A | 5/1981 | Eddelman et al. | |
| 4,327,745 A | 5/1982 | Ford | |
| 4,328,828 A | 5/1982 | Cianci | |
| 4,340,067 A | 7/1982 | Rattenborg | |
| 4,465,485 A | 8/1984 | Kashmer et al. | |
| 4,483,825 A | 11/1984 | Fatches | |

(Continued)

FOREIGN PATENT DOCUMENTS

| | | |
|---|---|---|
| FR | 2.220.135 | 9/1974 |
| GB | 1 463 807 | 2/1977 |
| WO | WO 87/00439 | 1/1987 |

OTHER PUBLICATIONS

Merriam–Webster's Collegiate Dictionary (10th ed. 1999) p. 68.*
Dorlans Medical Dictionary, http://www.mercksource.com/pp/us/cns/printpage_hl.jsp, p. 11 of 16.*
English translation of FR 2,220,135 (above).

*Primary Examiner*—Krissane Jastrzab (57) ABSTRACT

A hollow pipette member open at its opposite ends contains a plug of porous, hydrophobic material force fitted between its ends to define a liquid sample chamber between the plug and one end of the tube. At least a major portion of the pores of the plug material are impregnated with particles of a liquid scavenging material which are of smaller size than the pores so as to allow gas to be drawn through the plug. The liquid sample chamber is of predetermined volume greater than the volume of liquid drawn by a suitable suction device attached to the opposite end of the tube, so that an air gap will remain between the drawn sample and the plug. Any liquid droplets vaporized and drawn into the plug member will contact the hydrophilic particles, which will expand to block passage through those pores while still permitting gas flow through other pores. If the liquid sample itself contacts the plug, enough particles will expand to completely block gas or liquid flow through the plug.

U.S. PATENT DOCUMENTS

| | | |
|---|---|---|
| 4,588,555 A | 5/1986 | Provonchee |
| 4,595,021 A | 6/1986 | Shimizu et al. |
| 4,604,205 A | 8/1986 | Ayers |
| 4,617,941 A | 10/1986 | Ichikawa et al. |
| 4,774,963 A | 10/1988 | Ichikawa |
| 4,810,394 A | 3/1989 | Masuda |
| 4,999,164 A | 3/1991 | Puchinger et al. |
| 5,019,349 A | 5/1991 | Suzuki |
| 5,364,595 A * | 11/1994 | Smith .................... 422/100 |

* cited by examiner

US 5,156,811 C1

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–12 are cancelled.

New claims 13–17 are added and determined to be patentable.

13. *A liquid sampling apparatus, comprising:*
*a suction device and a pipette tip;*
*the pipette tip comprising a hollow tube open at opposite first and second ends thereof;*
*a plug member of porous, hydrophobic material located in the tube between said first and second ends and spaced a predetermined distance from said second end to define a liquid sample chamber of predetermined volume below said plug member, at least a majority of pores of said porous material containing separate particles of a hydrophilic material for absorbing any liquid contacting said plug member, the particles being smaller than the pore size to allow gas to flow through said plug member, and comprising means for expanding and blocking said pores when contacted by a liquid; and*
*the first end of the tube comprising means for attachment to the suction device, the suction device being releasably secured to the first end of said hollow tube for drawing a predetermined volume of liquid less than the predetermined volume of the liquid sample chamber into said liquid sample chamber to leave an air gap of predetermined volume between a drawn liquid sample and the plug member, wherein the pores of the plug member have a pore size of the order of 25–40 microns.*

14. *A liquid sampling apparatus, comprising:*
*a suction device and a pipette tip;*
*the pipette tip comprising a hollow tube open at opposite first and second ends thereof;*
*a plug member of porous, hydrophobic material located in the tube between said first and second ends to define a liquid sample chamber of predetermined volume between the plug member and said second end of the tube, at least a majority of pores of said hydrophobic material containing separate particles of hydrophilic material for absorbing any liquid contacting said plug member; and*
*wherein the suction device is secured to the first end of said hollow tube for drawing a predetermined volume of liquid less than the predetermined volume of said liquid sample chamber into said liquid sample chamber to leave an air gap of predetermined volume between a drawn liquid sample and the plug member, and wherein the pores of the plug member have a pore size of the order of 25–40 microns.*

15. *A method of transferring a predetermined volume of liquid from one location to another for analysis, comprising the steps of:*
*attaching a suction device to a first end of a pipette tip, the pipette tip comprising an open-ended tube having a plug of porous, hydrophobic material positioned at a predetermined height in the tube to define a liquid sample chamber of predetermined volume between the plug and the opposite, second end of the tube, and to further define an air barrier chamber of predetermined dimensions between the plug member and the first end of the tube, at least a majority of pores of the plug containing separate hydrophilic particles of smaller dimensions than the pores;*
*placing the opposite end of the tube into a supply of liquid to be sampled;*
*applying suction to the first end of the tube via the suction device to draw a predetermined volume of liquid into the pipette tip until the surface of the drawn liquid lies a predetermined distance below the plug to form an air gap between the drawn liquid and plug;*
*absorbing any aerosol droplets carried into the plug in some of the hydrophilic particles in the pores to expand the particles and block some of the pores;*
*transferring the tube and drawn sample to a collection device for collecting the drawn sample; and*
*reversing the suction device to blow air back through the plug and eject the sample into the collection device, and wherein the pores of the plug member have a pore size of the order of 25–40 microns.*

16. *A liquid sampling apparatus comprising:*
*a pipette tip and a suction device;*
*the pipette tip comprising a hollow, gradually tapered tube open at first and second ends thereof;*
*a plug member of porous, hydrophobic material located in the tube between said first and second ends to define a liquid sample chamber of predetermined volume between the plug member and said second end of the tube and an air barrier chamber of predetermined dimensions between the plug member and the first end of the tube, separate particles of hydrophilic material for absorbing any liquid contacting said plug member being distributed in all the pores running through the hydrophobic material; and*
*wherein the suction device is releasably secured to the first end of said hollow tube for drawing a predetermined volume of said liquid less than the predetermined volume of said liquid sample chamber into said liquid sample chamber to leave an air gap of predetermined volume between a drawn liquid sample and the plug member;*
*wherein gas flow through the tube passes through the pores running through the plug member and, upon contact with the liquid sample, hydrophilic particles hydrate and expand to close off the pores running through the plug member, thereby rendering the plug member impregnable to both liquid and gas flow, and wherein the pores of the plug member have a pore size of the order of 25 to 40 microns.*

17. *A method of transferring a predetermined volume of liquid from one location to another for laboratory analysis using a liquid sampling apparatus, the liquid sampling apparatus comprising:* a pipette tip and a suction device;

the pipette tip comprising a hollow tube open at opposite first and second ends thereof;

a plug member of porous, hydrophobic material located in the tube between said first and second ends to define a liquid sample chamber of predetermined volume between the plug member and said second end of the tube, at least a majority of pores of said hydrophobic material containing separate particles of hydrophilic material for absorbing any liquid contacting said plug member;

wherein the suction device is secured to the first end of said hollow tube for drawing a predetermined volume of liquid less than the predetermined volume of said liquid sample chamber into said liquid sample chamber to leave an air gap of predetermined volume between a drawn liquid sample and the plug member;

the method comprising the steps of:

attaching the first end of the tube to the suction device;

placing the second end of the tube into a supply of liquid to be sampled;

applying suction to the first end of the tube via said suction device to draw a predetermined volume of the liquid sample into the tube until the surface of the drawn liquid sample lies a predetermined distance below the plug to form an air gap between the drawn liquid and the plug member;

transferring the tube and drawn liquid sample to a collection device for collecting the drawn sample; and reversing the suction device to blow air back through the plug member and eject the liquid sample into the collection device, and wherein the pores of the plug member have a pore size of the order of 25 to 40 microns.

\* \* \* \* \*